United States Patent [19]
Maisch et al.

[11] 3,944,014
[45] Mar. 16, 1976

[54] APPARATUS FOR THE COMPENSATION OF ACCELERATIONS CAUSING LATERAL DEVIATION OF A MOTOR VEHICLE

[75] Inventors: Wolfgang Maisch, Schwieberdingen; Helmut Domann, Leonberg, both of Germany

[73] Assignee: Robert Bosch GmbH, Stuttgart, Germany

[22] Filed: June 6, 1974

[21] Appl. No.: 476,929

[30] Foreign Application Priority Data
June 22, 1973 Germany............................ 2331616

[52] U.S. Cl............................. 180/79.1; 180/79.2 R
[51] Int. Cl.²............................................. B62D 5/04
[58] Field of Search...................... 180/79.2 R, 79.1

[56] References Cited
UNITED STATES PATENTS

| | | | |
|---|---|---|---|
| 2,987,135 | 6/1961 | Harvey | 180/79.2 R |
| 3,085,645 | 4/1963 | Bookout et al. | 180/79.2 R |

*Primary Examiner*—M. H. Wood, Jr.
*Assistant Examiner*—John A. Pekar
*Attorney, Agent, or Firm*—Edwin E. Greigg

[57] ABSTRACT

In a motor vehicle, the presence of laterally acting external forces is detected by an appropriate sensing device. The first time derivative of the sensed signal is used to initiate steering gear deflection to counteract the external deflecting forces.

2 Claims, 3 Drawing Figures

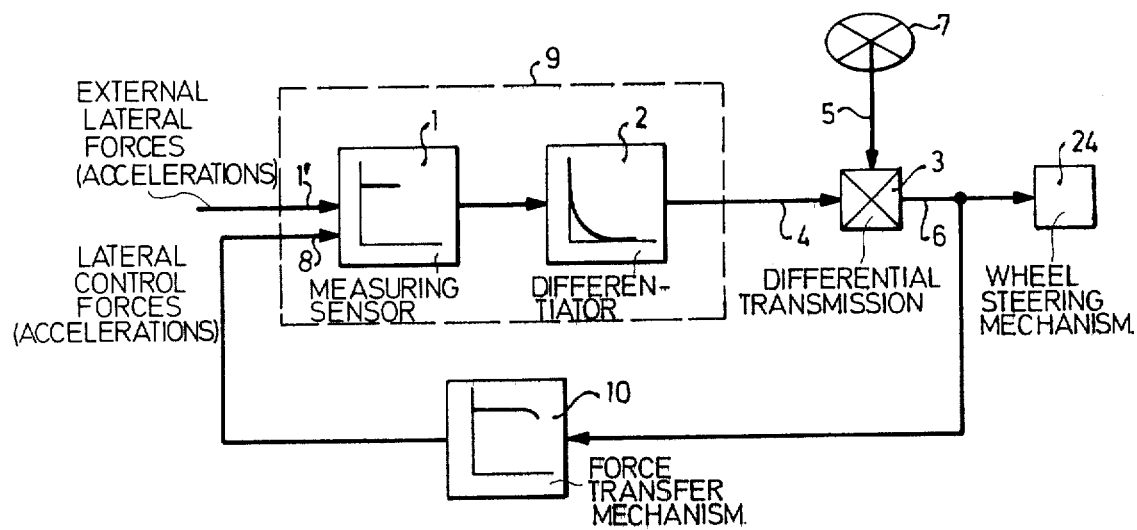
Fig. 1
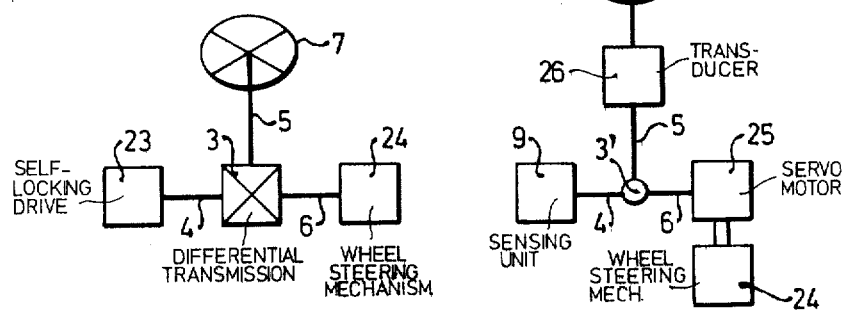
Fig. 2
Fig. 3

APPARATUS FOR THE COMPENSATION OF ACCELERATIONS CAUSING LATERAL DEVIATION OF A MOTOR VEHICLE

BACKGROUND OF THE INVENTION

The invention relates to an apparatus for the compensation of crosswind forces and of other forces causing a lateral deviation of a motor vehicle from its track. The apparatus automatically influences the steering of the vehicle, independently of the actuation of the steering mechanism by the operator. Especially at high vehicle velocities, the straight running of motor vehicles is influenced by crosswind. Especially in vehicles in which the point of attack of the resultant wind force and the center of mass of the vehicle are separated by some distance in the longitudinal direction of the vehicle, the effects of crosswind create a turning moment about the vertical axis and this turning moment tends to cause a pivoting of the longitudinal vehicle axis from the nominal direction of motion if the center of mass is located at the rear. As a result, at high vehicle velocities, the vehicle deviates excessively from the nominal track in a short time and this effect is in addition to the lateral deviation due to the wind. The vehicle operator is therefore obliged to apply a counter-steering effort to keep the vehicle running straight.

When the crosswinds acting on the vehicle fluctuate rapidly in strength and/or direction, extraordinary demands are made on the driver's powers of attention and traffic safety is impaired because of premature driver fatigue.

Known installations of the types described above have the aim, therefore, of changing the oblique running angle of the steering wheels in the sense of counter-steering for equalization of wind drift when a crosswind influence is present.

Thus, in a device which has become known for the elimination of crosswind sensitivity in motor vehicles, at least one pressure sensor is provided at two opposite sides of the vehicle to sense the air pressure created by the crosswind and it includes a servo setting member, controlled by the differential pressure on the two sides of the vehicle, which displaces the front axle carrier with respect to the longitudinal vehicle members and, in this way, causes the wheels to turn in the sense of a counter-steering effort. This known installation has the disadvantage that pressure-actuated operating cylinders of large dimensions are required for changing the relative positions of the structural members. This leads to high construction costs and space requirements and furthermore, the wheel deflection does not always occur smoothly so that the driver is subject to irritation.

In another known installation, a servomotor is coupled to the steering gear during the occurrence of a crosswind and superimposes a crosswind-dependent compensation torque onto the steering torque provided by the driver. This known installation requires only a small space and engages smoothly and without jerking if properly designed. Furthermore, all known installations for the compensation of crosswind influences are such that their action is essentially proportional to the drift forces due to the crosswind. The compensating torque, which is superimposed on the driver's efforts, is uniformly applied by the equalization system, even during extended crosswind influence, and the driver is relieved of the necessity to apply a counter-steering effort. However, it is desirable that the driver be informed about longer lasting external influences acting on his vehicle so that he can adjust his long-term manner of driving.

It is possible, in principle, to design the previously known compensation installations in such a way that they compensate for the crosswind influences only partially and not to their full extent.

In that case, it is left to the driver to compensate for a portion of the drift by appropriate counter-steering movements and he retains a feeling for the crosswind forces acting on the vehicle because of the remaining required steering wheel torque. On the other hand, while the driver need no longer make large steering motions in order to maintain straight running, a portion of his attention is still taken up by the necessity for immediate reaction to a sudden onset of wind drift.

OBJECTS AND SUMMARY OF THE INVENTION

It is an object of the invention to create an apparatus for the compensation of crosswind and of other perturbing forces causing a lateral deviation of a motor vehicle, which automatically engages the steering mechanism, independently of the actuation of the steering mechanism by the driver, and which carries out a steering correction to effect a complete short-term compensation of the deviations from the track of the vehicle when the perturbing forces causing a lateral deviation are changing. This object is attained, according to the invention, in that the apparatus includes means for the production of a signal derived directly from the crosswind pressure, or else from the actual lateral motion of the vehicle due to the crosswind or due to some other perturbing force. The apparatus includes means for the production of the first derivative of the signal and it further includes a differential transmission assembly to which the differentiated signal is applied to produce a steering effort, whose direction is in the sense of opposing the externally caused motion of the vehicle (counter steering) and whose magnitude is approximately proportional to the differentiated signal.

By using the first time derivative of the measured signal, the apparatus is able to compensate rapidly for forces tending to disturb the straight running of the motor vehicle and if these forces persist for any length of time, it can transmit to the driver either the total compensatory steering torque, or a portion thereof, within an adjustable time period, so as to inform him about the external forces acting on his vehicle.

BRIEF DESCRIPTION OF THE DRAWING

The present invention will be better understood and further objects and advantages will become more apparent from the ensuing detailed specification of a preferred, although only exemplary, embodiment of the invention, taken in conjunction with the drawing, wherein FIG. 1 is a schematic block diagram of an apparatus for the automatic compensation of lateral forces acting on a motor vehicle according to an exemplary embodiment of the invention.

FIG. 2 is a schematic block diagram of a control mechanism with a self-locking drive mechanism to couple the control torque to a differential transmission gear on the steering shaft which may be used in embodiments of the invention; and FIG. 3 is a schematic block diagram of a compensation system using an electrical superposition of the steering torques due to the driver and the compensation system.

DESCRIPTION OF THE PREFERRED EMBODIMENTS

The schematic block diagram of FIG. 1 shows a control loop for the automatic, short-term compensation of lateral accelerations acting on a motor vehicle and due to crosswind, road unevenness, and/or other perturbing influences which may cause a deviation of the track of the vehicle.

A measuring sensor 1 measures the resultant of the lateral accelerations 1' and 8 in a motor vehicle (not shown) due to, among others, the previously cited influences. Following the measuring sensor 1 is a differentiator 2 which differentiates the signal coming from the measuring sensor. The differentiated signal, which can be amplified if necessary, is fed to an input 4 of a differential transmission 3 which may be embodied as a gear train. Another input 5 of this differential transmission is provided with a signal related to the position of the steering wheel 7, determined by the driver. An output 6 of the differential transmission 3 acts on the conventional vehicle steering mechanism (not shown). The deflection of the steering mechanism steers the vehicle wheels and results in the exertion of a lateral control force on the vehicle, and an associated acceleration thereof, designated by the numeral 8. The magnitude of this force is related to the oblique running angle of the steered wheels by a function which depends, among other factors, on the characteristics of interaction of the vehicle's running gear with the road surface and this mechanism of interaction has been designated by the numeral 10.

The lateral acceleration 8, due to control forces, is superimposed on the lateral acceleration 1', due to the external influences, e.g., crosswind, and the resultant lateral acceleration, consisting of the sum of the two magnitudes 1' and 8, is detected by the measuring sensor 1. As is shown in the drawing by broken lines, the measuring sensor 1 and the differentiator 2 can be combined in single measuring unit 9. The regulation performed by the measuring sensor 1 and the differentiator 2 is such that rapidly fluctuating perturbing influences, which are produced by crosswind or by unevenness in the roadbed, are compensated by an automatic reaction of the steering mechanism of the vehicle. Furthermore, the driver's own, overly quick, steering wheel deflections are also automatically compensated for. In this way, an unstable driving situation is positively prevented. FIG. 2 shows the differential transmission 3 with its two inputs 4 and 5 and its output 6. A self-locking drive mechanism 23 is provided on one side of the differential transmission 3; a steering gear mechanism 24 is provided on the other side. Automatic engagement in the steering system is achieved through the self-locking drive 23.

Thus, if the automatic compensation should become ineffective, turning motions of the steering wheel 7 would remain fully effective for steering the vehicle without dragging along the automatic drive mechanism.

FIG. 3 is a diagram of an electrical version of the embodiment of FIG. 1. An electric differential transmission 3' is provided, at its input 4, with the parameter values deriving from the measuring unit 9, i.e., from the measuring sensor 1 and from the differentiator 2. Input 5 of the electric differential transmission is provided with the parameter values coming from the steering wheel 7 through a transducer 26. The output 6 is connected to a setting motor 25 which engages the steering mechanism through the steering gear 24.

It is to be understood that the invention is not limited to the specific description above or specific figures shown, but may be used in other ways without departure from its spirit or from its scope as defined by the following claims.

What is claimed is:

1. An apparatus for the automatic compensation of lateral accelerations acting on a motor vehicle, including a wheel steering mechanism and a manual steering wheel and shaft, comprising:
   A. sensor means, attached to the vehicle, to detect and measure the sum of the lateral accelerations acting on the vehicle and producing first electrical signals representative of said lateral accelerations;
   B. electric differentiating means connected to receive said first signals and providing second electrical signals corresponding to the first time derivative of said first electrical signals;
   C. differential transmission means which is provided with said second electrical signals from said differentiator and with position data from said steering shaft of the motor vehicle and which provides a steering signal for said steering mechanism of the motor vehicle in response to changes in said lateral forces.

2. An apparatus according to claim 1 further comprising:
   D. transducer means, associated with said steering shaft, and transforming the rotation of said steering shaft into a third electrical signal representative of the rotational position of said shaft;
   and wherein said differential transmission is an electric differential transmission means connected to said electrical differentiating means and to said transducer means, for processing said second signals and said third signals and for providing an electrical output control signal; said apparatus further comprising:
   E. servo-motor means, connected to receive said output control signal from said electric differential transmission, for engaging said steering mechanism to deliver a steering effort thereto related to the magnitude of said outpt control signal.

* * * * *